United States Patent [19]

Manassen

[11] 3,820,979

[45] June 28, 1974

[54] PROCESS FOR THE PRODUCTION OF METALS

[75] Inventor: Joost Manassen, Rehovot, Israel

[73] Assignee: Yeda Research & Development Company Ltd., Rehovot, Israel

[22] Filed: Jan. 7, 1972

[21] Appl. No.: 216,274

[30] Foreign Application Priority Data
Jan. 12, 1971  Israel................................ 35991

[52] U.S. Cl..................... 75/108, 75/.5 A, 75/117, 75/118, 75/121
[51] Int. Cl............................................... C22b 5/00
[58] Field of Search ............ 75/.5 A, 108, 117, 118, 75/121

[56] References Cited
UNITED STATES PATENTS
| | | | |
|---|---|---|---|
| 1,592,173 | 7/1926 | Bardt | 75/108 |
| 2,390,540 | 12/1945 | Keller | 75/108 |
| 2,657,119 | 10/1953 | Patton | 423/243 |
| 3,334,995 | 8/1967 | Gaspar | 75/118 |
| 3,424,575 | 1/1969 | Long | 75/117 |
| 3,463,635 | 8/1969 | Rhodes et al. | 75/121 |

*Primary Examiner*—Herbert T. Carter
*Attorney, Agent, or Firm*—Ostrolenk, Faber, Gerb & Soffen

[57] ABSTRACT

A process for the production of metallic metals selected from the group consisting of copper, silver and mercury, which comprises contacting an aqueous solution of the metal compound with a solution of a reduced quinonic compound, preferably an anthraquinone compound, in an organic solvent which is substantially insoluble in and immiscible with water, resulting in the precipitation of the metallic compound which is recovered. The organic phase may be separated, the quinonic compound may be reduced and used again for treating subsequent batches of metal salts.

8 Claims, No Drawings

PROCESS FOR THE PRODUCTION OF METALS

BACKGROUND OF THE INVENTION

1. Field of the Invention

The present invention relates to a novel process for the production of certain metals of a high degree of purity, and especially for the production of copper. The metals are obtained from solutions of salts of same by reduction, and the reducing agent can be used repeatedly. Other metals which can be obtained are silver and mercury, and the method according to the present invention can also be used for the separation of these metals from other metals contained in the starting solution. These and further features of the invention will become apparent from the following description.

2. Description of the Prior Art

One of the conventional processes for the production of metallic copper comprises treating the copper ore with an aqueous mineral acid, preferably sulfuric acid, resulting in an aqueous solution of the copper salt, which is copper sulfate if sulfuric acid is used, and subjecting the resulting aqueous solution to electrolysis, resulting in the desired metallic product. When relatively poor ores are used as starting material, the aqueous solutions obtained are of low concentration and electrolysis is not an economical process. In this case, the copper is first precipitated from the solution in impure form, and this is subsequently purified, after dissolution, by electrolysis.

The most widely used process for the precipitation of copper from solutions of same is by the use of iron. The copper salt solution is either percolated over metallic iron chips or it is left to stand in largs ponds with scrap iron. The copper is precipitated as metallic copper, and it contains generally from about 10 to 50 per cent by weight of iron. If pure metallic copper is desired, the precipitate must be dissolved and purified, the purification being generally by electrolysis.

There is also known a process for the reduction of copper solutions by means of gaseous hydrogen in the presence of suitable catalysts, resulting in the precipitation of metallic copper in the form of a powder, which can be used in powder metallurgy. This process requires the use of elevated temperatures and pressures.

As contrasted with the conventional processes used hitherto, the process according to the present invention results directly in the production of metal, such as copper or silver powder or metallic mercury, of a high degree of purity, the process being effected at ambient temperature and pressure.

SUMMARY OF THE PRESENT INVENTION.

The process according to the present invention comprises contacting an aqueous solution of a water soluble salt of the metal to be precipitated (copper, silver or mercury) with a solution of a reduced quinonic compound, which latter is dissolved in an organic water-immiscible solvent, resulting in the precipitation of the metal; which is obtained as powder in the case of copper and silver, and as metallic mercury in the case of mercury salts. After the precipitation, the precipitate is separated, the organic phase is separated from the aqueous one, and if desired, the organic quinonic compound is reduced and used for the treatment of further batches of the metallic salt. The process can be carried out batch-wise, in countercurrent or in a continuous manner. Especially advantageous reducing agents are anthraquinones.

A suitable quinonic compound, and especially an anthraquinone compound, is reduced; it is subsequently dissolved in a suitable organic solvent, which solvent is insoluble in, and immiscible with water. The resulting solution can be used for the process according to the invention. The quinonic compound can also be first dissolved in the solvent and be subsequently reduced.

The aqueous solution of the metal salt is mixed with the organic solution of the quinonic compound and the solutions are thoroughly agitated. The metal salt is reduced and a precipitate of chemically substantially pure metal is obtained. The metal is easily separated; the organic phase is separated from the aqueous one and the quinonic compound can be reduced and used for the treatment of further batches of metal salt.

It has been found that anthraquinones, and especially substituted anthraquinones, are suited for the process according to the present invention. Suitable compounds are, for example, 2-methyl anthraquinone, 2-ethyl anthraquinone, 2-propyl anthraquinone, 2-isopropyl anthraquinone, 2-t-butyl-anthraquinone, 2-amyl anthraquinone, etc. These anthraquinones can be easily produced by the condensation of a suitable substituted diene and naphthoquinone, according to the procedure of Allen et al., Org. Synth. 22, 37 (1947).

An important consideration in the choice of the anthraquinones is its solubility in the organic solvent system used. If concentrated solutions are preferred, it is advisable to make use of compounds such as t-butyl anthraquinone, which is of higher solubility than, for example, methyl-anthraquinone. This applies both to the reduced as well as to the oxidized state of these compounds.

Solvent systems suitable both for the quinonic and for the reduced form are combinations of aromatic and polar solvents. In order to minimize losses due to the evaporation of the organic solvent, solvents such as alkyl toluenes, alkyl naphthalenes or diphenyls are advantageously resorted to. As polar solvents, there are advantageously used compounds such as octanol, ethyl hexanol or heptanol. Esters such as dialkyl phthalates, diaryl phthalates, alkyl benzoates, benzyl acetates, ethyl heptanoates, cyclohexanol acetates or propionates can be used as such or in combination with one of the solvents set out hereinbefore.

The quinonic form of the compounds used in the process according to the invention can be reduced by means of conventional hydrogenation catalysts such as Raney nickel, or by catalysts of the platinum or palladium type, supported on conventional supports, such as activated carbon, barium sulfate, calcium carbonate, silica gel or the like.

It is possible to reduce and pricipitate a large part of the metal contained in the solution, which is reducable by the reducing agent used, in one stage, employing an excess of the reducing agent. It is advantageous to effect the process in two or more stages, using in each stage a suitable quantity of fresh organic solution. It is also possible to effect the process in countercurrent, as for example set out by Alders in Liquid-Liquid Extraction, Elzevier, Ansterdam, 1959, page 84.

DESCRIPTION OF THE PREFERRED EMBODIMENTS

The following examples are intended to illustrate the invention, which is not restricted to same. Many details of the nature of the reaction system, the quinonic compounds used other parameters of the reaction can be varied without departing from the scope of the present invention.

EXAMPLE 1

A quantity of 6 g t-butyl anthraquinone was dissolved in a mixture of 50 ml xylene and 50 ml 2-ethyl-hexanol. The anthraquinone was reduced at atmospheric pressure and ambient temperature by admixing a quantity of 140 mg of 10 percent palladium on calcium carbonate as catalyst and by introducing hydrogen until the absorption of hydrogen ceased. The catalyst was filtered off, and the thus obtained solution was divided into two equal portions, A and B. Portion A was added to a solution of 10 millimoles of copper sulfate in 150 ml water and the reaction system was stirred during one hour. Copper powder was precipitated, filtered off and the organic phase was separated from the aqueous one. The aqueous phase was admixed with the portion B and the process was repeated for a further hour. At the end of this period of time, the precipitate was filtered off, the organic phases were united and again subjected to catalytic reduction. The process was repeated four times, each time with an identical quantity of aqueous copper sulfate solution. The following table summarizes the results obtained:

| Run No: | Copper from 1st stage | Copper from 2nd stage | Total Copper |
|---|---|---|---|
| 1 | 447 mg. | 176 mg. | 623 mg. |
| 2 | 400 mg. | 218 mg. | 618 mg. |
| 3 | 363 mg. | 250 mg. | 613 mg. |
| 4 | 376 mg. | 238 mg. | 614 mg. |

The copper powder was analyzed and found to be 100 percent pure copper. The theoretical value is 635 mg. The difference is due to mechanical losses and due to the work with small quantities. The organic layer did not contain any copper and the residual aqueous solutions contained only a few milligrams.

EXAMPLE 2

A quantity of 4.44 g of 2-methylanthraquinone was dissolved in 300 ml ethyl acetate and this was reduced, using 140 mg 10 percent palladium on calcium carbonate, until an uptake of 300 ml of hydrogen (12 m-moles) had taken place. The solution was divided into two equal parts and an aqueous solution of 150 ml. containing 10 millimoles copper sulfate was treated in the same manner as in Example 1.

The first precipitation gave 270 mg copper powder, the second precipitation gave 367 mg copper powder. The residual solution did not contain any copper and the copper powder was analytically pure. It is evident from this example that only a slight excess of hydrogen is necessary for reducing the copper contained in the solution.

EXAMPLE 3

A quantity of 4.44 g (20 m-moles) of 2-methyl-anthraquinone was dissolved in 150 ml of 2-ethylhexanol and 150 ml xylene.

After hydrogenation until hydrogen uptake ceased, a solution of 10 millimoles copper sulfate in 150 ml of water was treated as in Example 1, resulting in the first precipitation of 564 mg copper, a second precipitation of 73 mg copper, total of 637 mg copper. The purity of the metallic copper was 100 percent.

EXAMPLE 4

A quantity of 6.66 g of 2-methyl anthraquinone was dissolved in a mixture of 225 ml of 2-ethylhexanol and 225 ml of xylene and the solution was divided into three equal portions of 150 ml each. Two of these portions were hydrogenated, using 140 mg of a 10% palladium on calcium carbonate catalyst.

A solution of 10 millimoles of copper sulfate in 150 ml of water was stirred with one of the filtered reduced solution during 1 hour, the formed copper precipitate was filtered off and the aqueous layer was treated with the second portion of the reduced solution. Due to the filtrations about 2 per cent of the organic solution was lost and was replenished from the third portion.

The two replenished 150 ml portions were reduced again, the catalyst was filtered off and a further copper solution was treated in a similar manner. This was repeated 10 times. After the 10th cycle the infrared spectrum of the organic solution was examined and no visible change could be detected. In the following table there are given the results of these runs:

| Run No. | Copper from first stage | Copper from 2nd stage | Total Copper |
|---|---|---|---|
| 1 | 332 mg | 300 mg | 632 mg |
| 2 | 518 mg | 103 mg | 621 mg |
| 3 | 372 mg | 255 mg | 627 mg |
| 4 | 224 mg | 397 mg | 621 mg |
| 5 | 300 mg | 334 mg | 634 mg |
| 6 | 575 mg | 57 mg | 632 mg |
| 7 | 416 mg | 210 mg | 626 mg |
| 8 | 545 mg | 77 mg | 622 mg |
| 9 | 386 mg | 235 mg | 621 mg |
| 10 | 534 mg | 79 mg | 613 mg |

It is clear that the yield is nearly quantitative.

EXAMPLE 5

A quantity of 4.44 g of 2-methyl anthraquinone was dissolved in a mixture of 150 ml 2-ethylhexanol and 150 ml xylene. The solution was divided into two equal portions and hydrogenated as set out in the preceding Examples. An aqueous solution of 10 millimoles of copper sulfate and 1 millimole each of iron sulfate, cobalt sulfate and nickel sulfate in 150 ml water was prepared. Precipitation in two stages, as in Example 1, gave a precipitate of 617 mg of pure copper powder. The other metals were not precipitated.

EXAMPLE 6

A solution of 2.22 g 2-methyl anthraquinone in 75 ml 2-ethylhexanol and 75 ml xylene was reduced as set out in the previous examples. It was stirred with an aqueous solution of 1.5 g of silver acetate in 150 ml water for 45 minutes. There was formed a precipitate of metallic silver, which was removed by filtration. There was obtained a quantity of 969 mg of silver. The purity was 100 percent.

EXAMPLE 7

A reduced organic solution as in Example 6 was stirred during 45 minutes with a solution of 2.5 g mercuric acetate in water. A precipitate of the metallic mercury was obtained. It was 100 percent pure.

I claim:

1. A process for the production of metallic copper, silver or mercury from an aqueous solution of a water soluble salt of said metals which comprises contacting said aqueous solution with a solution of a reduced 2-(lower alkyl)-anthraquinone in an organic solvent which is substantially insoluble in and immiscible with water and is also a solvent for the oxidized (anthraquinone) form of said reduced anthraquinone, whereby said metallic metal will precipitate, and separating the resulting metallic metal precipitate from the reaction system.

2. The process of claim 1 wherein said 2-(lower alkyl)-anthraquinone is selected from the group consisting of 2-methyl-anthraquinone, 2-ethyl-anthraquinone, 2-propylanthraquinone and 2-tert-butyl-anthraquinone.

3. The process of claim 1 wherein said organic solvent is a mixture of an aromatic solvent and a polar solvent.

4. The process of claim 3 wherein said aromatic solvent is xylene or toluene and said polar solvent is 2-ethylhexanol.

5. The process of claim 1 wherein the metal is copper and said metal salt is copper sulfate or copper acetate.

6. The process of claim 1 wherein said metal is copper and wherein said aqueous solution additionally contains water soluble salts of nickel, cobalt or iron.

7. The process of claim 1 wherein the precipitation is effected by contacting the aqueous solution with a number of batches of the reduce anthraquinone solution, one after the other.

8. The process of claim 1 wherein after precipitation of the metal, the organic phase is separated, the anthraquinone compound therein is reduced and the resulting solution is used to repeat the process of claim 1.

* * * * *